United States Patent
Cantor et al.

(10) Patent No.: US 8,702,147 B2
(45) Date of Patent: Apr. 22, 2014

(54) DUAL STAGE VARIABLE LOAD ENERGY ABSORBER FOR VEHICLE SEATING

(71) Applicant: ARCCA Incorporated, Penns Park, PA (US)

(72) Inventors: Alan Cantor, Ivyland, PA (US); Michael Markushewski, Huntingdon Valley, PA (US); Gary R. Whitman, Jamison, PA (US); Daniel McDonough, Souderton, PA (US); Larry A. Sicher, Quakertown, PA (US); Louis A. D'Aulerio, Horsham, PA (US); Donald K. Eisentraut, Kintnersville, PA (US); Tim Keon, Chalfont, PA (US)

(73) Assignee: Arcca Incorporated, Penns Park, PA (US)

( * ) Notice: Subject to any disclaimer, the term of this patent is extended or adjusted under 35 U.S.C. 154(b) by 0 days.

(21) Appl. No.: 13/889,787

(22) Filed: May 8, 2013

(65) Prior Publication Data

US 2014/0077519 A1     Mar. 20, 2014

Related U.S. Application Data

(60) Division of application No. 12/721,915, filed on Mar. 11, 2010, now Pat. No. 8,439,420, which is a continuation-in-part of application No. 12/401,708, filed on Mar. 11, 2009, now Pat. No. 8,162,374.

(51) Int. Cl.
*B60N 2/427* (2006.01)

(52) U.S. Cl.
USPC .................. 296/68.1; 296/65.02; 297/216.17

(58) Field of Classification Search
USPC ............ 296/68.1, 65.13, 65.14, 65.01, 65.02; 297/216.17, 216.16, 344.12, 344.18; 244/122 R
See application file for complete search history.

(56) References Cited

U.S. PATENT DOCUMENTS

| 3,968,863 | A | 7/1976 | Reilly |
| 4,408,738 | A | 10/1983 | Mazelsky |

(Continued)

FOREIGN PATENT DOCUMENTS

| DE | 19702398 C1 | 7/1998 |
| EP | 0682191 A1 | 11/1995 |

(Continued)

OTHER PUBLICATIONS

"Mine Blast Utility Troop Seat," Mobility & Protection Systems, 2007, 2 pages.

(Continued)

*Primary Examiner* — Jason S Morrow
(74) *Attorney, Agent, or Firm* — Panitch Schwarze Bellisario & Nadel LLP

(57) ABSTRACT

A vehicle safety seat system includes a seat, and a frame and support surface that are movable with respect to each other between rest and attenuated positions, wherein the frame and support surface are respectively a first and second distance apart. A biasing mechanism biases the frame and support surface to the rest position between blast and slam down phases. A damper coupled between the frame and support surface has blast and rebound recovery resistance settings. The blast resistance setting is set to a predetermined value based on a weight of a seat occupant. The damper, during the blast phase, resists motion between the frame and support surface toward the attenuated position based upon the blast resistance setting, and after the blast phase and prior to the slam down phase, resists motion between the frame and support surface toward the rest position based upon the rebound recovery resistance setting.

9 Claims, 13 Drawing Sheets

(56) References Cited

U.S. PATENT DOCUMENTS

| | | |
|---|---|---|
| 5,758,859 A | 6/1998 | Gonzalez |
| H1833 H | 2/2000 | Hoppel et al. |
| 6,155,601 A | 12/2000 | Cantor et al. |
| 6,179,380 B1 | 1/2001 | Hoffman |
| 6,378,939 B1 | 4/2002 | Knoll et al. |
| 6,394,393 B1 | 5/2002 | Mort |
| 6,520,541 B1 | 2/2003 | Cantor |
| 6,585,190 B2 | 7/2003 | Mort |
| 7,070,153 B1 | 7/2006 | Stenard |
| 7,445,181 B2 | 11/2008 | Knoll et al. |
| 7,484,799 B2 | 2/2009 | Meyer |
| 7,822,522 B2 | 10/2010 | Wereley et al. |
| 8,162,374 B2 | 4/2012 | Cantor et al. |
| 8,182,044 B2 | 5/2012 | Mullen |
| 8,439,420 B2 | 5/2013 | Cantor |
| 2005/0098399 A1* | 5/2005 | Bremner ............ 188/266 |
| 2007/0035167 A1 | 2/2007 | Meyer |
| 2009/0189407 A1* | 7/2009 | Lewis, II ............ 296/65.02 |
| 2009/0218867 A1 | 9/2009 | Clark |

FOREIGN PATENT DOCUMENTS

| | | |
|---|---|---|
| GB | 2397865 A | 8/2004 |
| WO | 0200465 A1 | 1/2002 |

OTHER PUBLICATIONS

"Mine Blast Driver/Passenger Seat," Mobility & Protection Systems, BAE Systems, 2008, 2 pages.

"Mine Blast Driver/Commander Seat," Mobility & Protection Systems, BAE Systems, 2008, 2 pages.

International Search Report and Written Opinion Issued Sep. 17, 2010 in Int'l Application No. PCT/US2010/026981.

Office Action issued Aug. 18, 2011 in U.S. Appl. No. 12/401,708.

Int'l Preliminary Report on Patentability issued Sep. 22, 2011 in Int'l Application No. PCT/US2010/026981; Written Opinion.

Office Action issued Sep. 13, 2012 in U.S. Appl. No. 12/721,915.

* cited by examiner

DUAL STAGE VARIABLE LOAD ENERGY ABSORBER FOR VEHICLE SEATING

CROSS-REFERENCE TO RELATED APPLICATIONS

This application is divisional application of U.S. patent application Ser. No. 12/721,915, filed on Mar. 11, 2010, currently pending, entitled "Dual Stage Variable Load Energy Absorber for Vehicle Seating," which is a continuation-in-part of U.S. patent application Ser. No. 12/401,708, filed on Mar. 11, 2009 entitled "Dual Stage Variable Load Energy Absorber for Vehicle Seating," the entire contents of all of which are incorporated by reference herein.

BACKGROUND OF THE INVENTION

An embodiment of the present invention relates generally to a vehicle safety seat system, and more particularly, to a dual stage variable load energy absorber for preventing injuries to occupants in vehicles during mine blasts or the like for both blast and slam down crash phases.

During the 1980's, energy absorbers (EAs) were developed and extensively tested for certain rotary wing aircraft (e.g., helicopters). The purpose of these devices was to limit the vertical loading (accelerations) experienced by the occupants, and thus reduce the probability of serious injuries that could occur during certain types of crash events. As a result of this development, unique and discrete EAs were ultimately integrated into several series of U.S. Military helicopters and, more recently, select ground vehicles, and these devices have been successfully used for decades to reduce the probability of crash induced spinal injuries.

Helicopter seat mounted EA devices and current ground vehicle EA devices only operate to mitigate a single loading event over a well defined range of exposures. When a military type ground vehicle is exposed to a blast, the occupant experiences two defined exposures within a short time period: loading from the blast itself as the vehicle is being propelled upward and when the vehicle returns to the earth, which produces a "slam down." The force exposure of the slam down can be just as severe as the force exposure of the blast portion. Thus, strict adaptations of the helicopter EA devices (currently in use in select ground vehicles) are not sufficiently effective. Prior attempts to adapt the helicopter EA devices create additional hazards for the ground vehicle occupant without completely mitigating the exposure experienced by the occupant.

The function of an EA is to permit the seat to stroke downward in a controlled manner to reduce the crash loads and accelerations applied to the occupant, (i.e., limit acceleration forces applied to the seated occupant) as compared to the crash acceleration input at the floor of the vehicle. The stroking is designed specifically to initiate at a predetermined force level and continue until the input load drops below the threshold of human injury tolerance. The available stroke distance must be sufficiently long to avoid expending the stroke distance and instantaneously acquiring the velocity of the vehicle floor. The basis for the theory behind this concept is the law of "conservation of energy," which manages the energy of a crash through reshaping the occupant's acceleration versus time response curve in a manner that reduces the peak accelerations. Adaptations of helicopter EA devices for use in Military Ground Vehicles do not account for the dual effect of the blast and slam down, nor do they account for the variation in load created by the varying weights of the occupant, both with and without battle gear, or the variable sizes of blasts experienced by military vehicles.

In a Military Ground Vehicle, the effect of any given blast can have a large variability due to the variability in occupant mass, but is also exacerbated by the point of blast contact with the vehicle, the magnitude of the blast (blast energy), the type of blast, and the vehicle's characteristics, such as mass and deformation. This variability poses a unique threat in that the input shock effect and input acceleration to the occupants can vary widely in both magnitude and direction. Unlike ground vehicles exposed to a large variety of mine and Improvised Explosive Device (IED) blasts, the vertical input accelerations imposed during helicopter crashes are relatively predictable and fall within a known, and relatively narrow, band. One reason is that many survivable helicopter crashes tend to occur as a result of power loss followed by autorotation where the aircraft impact velocity vector is well established both in magnitude and direction. In contrast, a ground vehicle exposed to a blast experiences the wide range of input accelerations and orientations due to the blast itself, followed by the input accelerations resulting from the subsequent slam down when the vehicle returns to the ground. The slam down acceleration vectors also vary greatly due to the blast severity, the orientation of the vehicle when it impacts the ground, and the ground characteristics.

It is therefore desirable to provide an EA device for a military-type ground vehicle that accounts automatically for the variation in total occupant seated mass; provides energy absorption for the variable blast phase; provides energy absorption for the slam down phase by automatically resetting itself after the blast phase; prevents "bottoming out" during either of the loading phases so as to not generate a dynamic amplification spike to the occupant; and maintains crash effectiveness in either frontal, lateral, rear or rollover crash events.

BRIEF SUMMARY OF THE INVENTION

Briefly stated, an embodiment of the present invention comprises a mine blast and slam down protective vehicle safety seat system including a vehicle seat, a frame supporting the vehicle seat, and a support surface supporting the frame. The frame and support surface are movable with respect to each other between a rest position, wherein the frame and support surface are a first distance apart, and an attenuated position, wherein the frame and support surface are a second distance apart. The second distance is less than the first distance. A biasing mechanism biases the frame and support surface to the rest position between a blast phase and a slam down phase. A variable resistance damper is operatively coupled between the frame and the support surface. The damper has a blast resistance setting to account for variable loading and a rebound recovery resistance setting. The blast resistance setting is automatically set to a predetermined value based on a weight of an occupant of the vehicle seat. The damper is configured to (i) during the blast phase where the support surface and frame move toward each other, resist respective motion between the frame and the support surface based upon the blast resistance setting until the frame and support surface reach the attenuated position, and (ii) after completion of the blast phase, resist respective motion between the frame and the support surface caused by the biasing mechanism based upon the rebound recovery resistance setting until the frame and support surface reach the rest position prior to the slam down phase.

Another embodiment of the present invention comprises a method of protecting a vehicle occupant positioned on a vehicle seat which is movably mounted with respect to a vehicle floor in an explosive blast. The method includes determining a weight of the occupant in the seat, establishing a blast resistance setting based upon the weight of the occupant, and establishing a rebound recovery resistance setting. The method further includes, during a blast phase, resisting respective motion between the vehicle seat and the vehicle floor based upon the blast resistance setting. The method also includes, after completion of the blast phase and prior to a slam down phase, resisting respective motion between the vehicle seat and the vehicle mount based upon the rebound recovery resistance setting.

A further embodiment of the present invention comprises a mine blast and slam down protective vehicle safety seat system including a vehicle seat, a frame supporting the vehicle seat, and a support surface supporting the frame. The frame and support surface are movable with respect to each other between a rest position, wherein the frame and support surface are a first distance apart, and an attenuated position, wherein the frame and support surface are a second distance apart. The second distance is less than the first distance. A biasing mechanism biases the frame and support surface to the rest position between a blast phase and a slam down phase. A damper is operatively coupled between the frame and the support surface. The damper has a resistance setting. The damper is configured to, during the blast phase where the support surface and frame move toward each other, resist respective motion between the frame and the support surface based upon the resistance setting until the frame and support surface reach the attenuated position.

Yet another embodiment of the present invention comprises a mine blast and slam down protective vehicle safety seat system including a vehicle seat and a support surface supporting the vehicle seat. The vehicle seat and support surface are movable with respect to each other between a rest position, wherein the vehicle seat is located a first distance from a bottom surface of the vehicle, and an attenuated position, wherein the vehicle seat is located a second distance from the bottom surface of the vehicle. The first distance is greater than the second distance. A deformable bladder is operatively coupled between the vehicle seat and the support surface. The deformable bladder contains a gas therein. A valve with a gas release setting is in fluid communication with the gas in the bladder. The vehicle seat is configured to, during a blast phase where the vehicle seat and the support surface move with respect to each other toward the attenuated position, deform the bladder against the support surface such that a predetermined volume of gas is released through the valve according to the gas release setting to resist the respective motion of the vehicle seat and the support surface until the vehicle seat and support surface reach the attenuated position.

Still another embodiment of the present invention comprises a mine blast and slam down protective vehicle safety seat system including a vehicle seat and a support surface supporting the vehicle seat. The vehicle seat and support surface are movable with respect to each other between a rest position, wherein the vehicle seat is located a first distance from a bottom surface of the vehicle, and an attenuated position, wherein the vehicle seat is located a second distance from the bottom surface of the vehicle. The first distance is greater than the second distance. A hydraulic cylinder having hydraulic fluid therein is operatively coupled to the vehicle seat and configured for movement therewith. A valve is in fluid communication with the hydraulic fluid in the cylinder to release the hydraulic fluid from the cylinder when a fluid pressure in the cylinder exceeds a predetermined value. A piston is coupled to the support surface and is configured to, during a blast phase where the vehicle seat and the support surface move with respect to each other toward the attenuated position, displace the hydraulic fluid in the cylinder according to the predetermined fluid pressure value to resist the respective motion of the vehicle seat and the support surface until the vehicle seat and support surface reach the attenuated position.

Yet another embodiment of the present invention comprises a mine blast and slam down protective vehicle safety seat system including a vehicle seat and a support surface supporting the vehicle seat. The vehicle seat and support surface are movable with respect to each other between a rest position, wherein the vehicle seat is located a first distance from a bottom surface of the vehicle, and an attenuated position, wherein the vehicle seat is located a second distance from the bottom surface of the vehicle. The first distance is greater than the second distance. A roller assembly is coupled to the support surface and includes a plurality of rollers. At least one of the plurality of rollers has an adjustable position on the roller assembly with respect to the other ones of the plurality of rollers. A flexible rod is received by the roller assembly and routed through the plurality of rollers. The vehicle seat is connected to the rod and configured to, during a blast phase where the vehicle seat and the support surface move with respect to each other toward the attenuated position, pull the rod in a direction of motion of the vehicle seat. The roller assembly resists respective motion of the vehicle seat and the support surface until the vehicle seat and the support surface reach the attenuated position by applying a tension to the rod as the rod is deformed over the plurality of rollers. The tension is set to a predetermined value.

BRIEF DESCRIPTION OF THE DRAWINGS

The foregoing summary, as well as the following detailed description of preferred embodiments of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

DETAILED DESCRIPTION OF THE INVENTION

Figure 1:
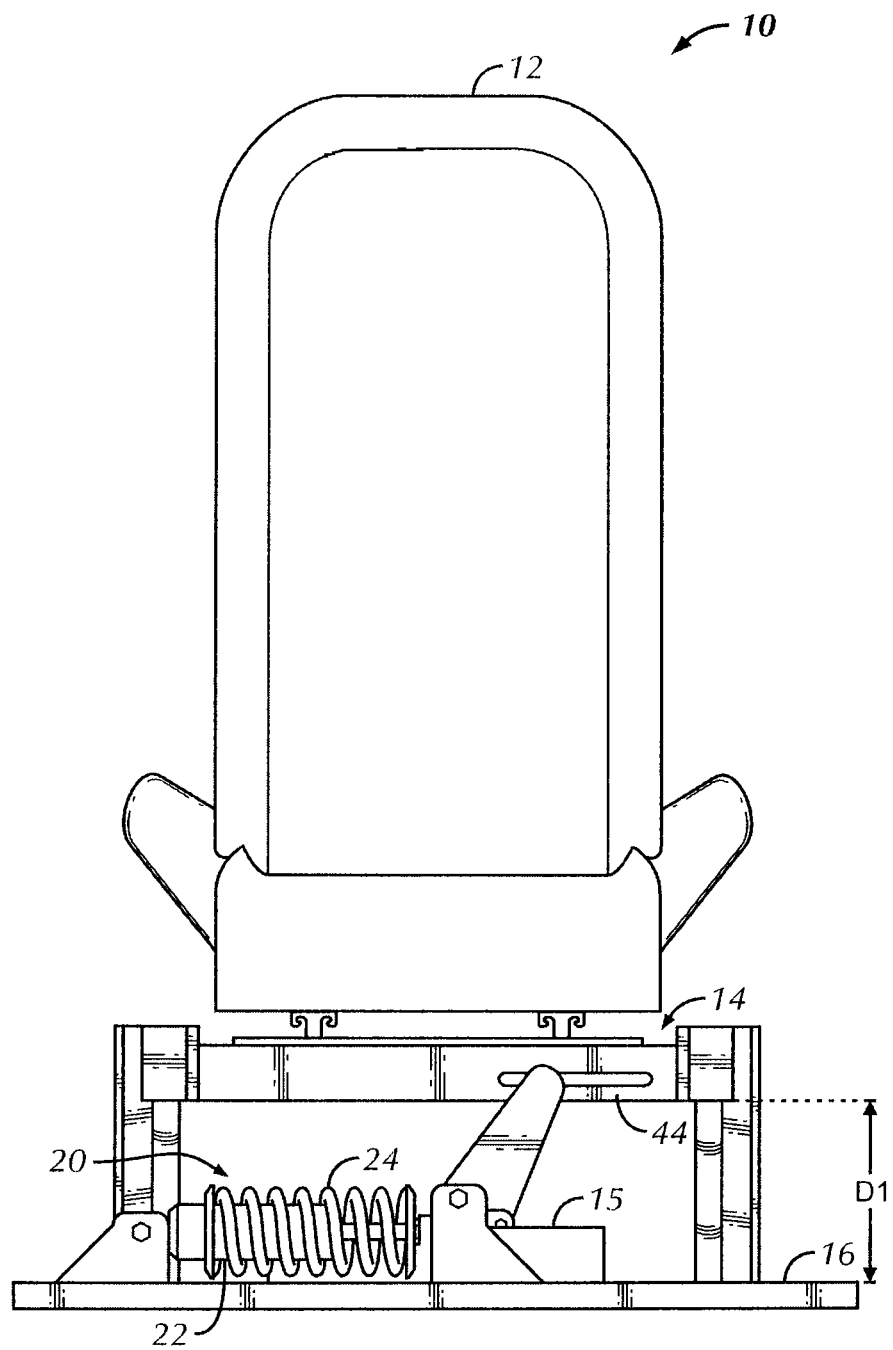
FIG. 1 is a rear side elevational view of a vehicle safety seat system in a rest position in accordance with a preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the vehicle seat safety system and designated parts thereof. The terminology includes the above-listed words, derivatives thereof, and words of similar import. Additionally, the words "a" and "an", as used in the claims and in the corresponding portions of the specification, mean "at least one."

Referring to the drawings in detail, wherein the same reference numerals indicate like elements throughout, there is shown in FIG. 1 a vehicle safety seat system, generally designated 10, having a vehicle seat 12, a frame 14 supporting the vehicle seat 12, and a support surface 16 supporting the frame 14. The vehicle seat 12 may be of any type that can be ordinarily installed in a vehicle (not shown), particularly a military vehicle, which may be subject to space and mounting location requirements based on equipment and the like. For example, U.S. Pat. Nos. 6,155,601 and 6,520,541, both of which are incorporated by reference herein, disclose seats that may be employed for use in the vehicle safety seat system 10.

Figure 2:
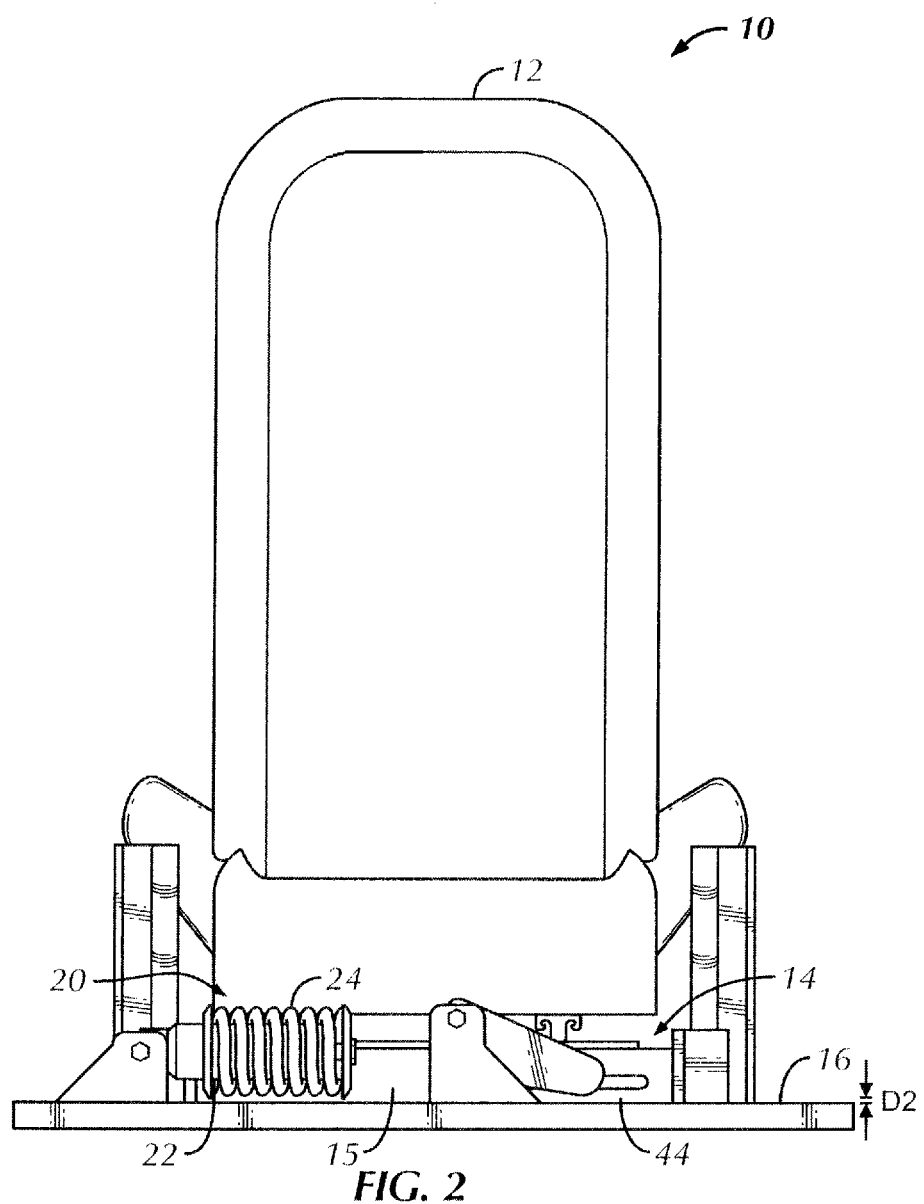
FIG. 2 is a rear side elevational view of the vehicle safety seat system of FIG. 1 in an attenuated position.

The vehicle safety seat system 10 is preferably installed as a unit (i.e., the seat 12, the frame 14, and the support surface 16 are installed together) in a vehicle in either the front or back seat positions. The seat 12 may, however, be removably coupled to the frame 14 such that the frame 14 and the support surface 16 alone may be installed in the vehicle and the seat 12 may be mounted thereon at a later time. The seat 12 is also preferably detachable for purposes of cleaning, repair, replacement, or the like, or if more storage space is required in the vehicle. Similarly, the frame 14 may also be removably attached to the support surface 16 such that the support surface 16 alone may be installed in the vehicle. Alternatively, the support surface 16 may comprise at least a portion of the floor or other surface of the vehicle itself, such as a bulkhead behind the seat, wall, floor, rear mounting, or suspended from an overhead roof structure. The frame is preferably manufactured using a lightweight, durable material, such as steel. However, other suitable materials, or combinations of materials, may be used such as plastics, polymers, metals, metal alloys, or the like. The support surface 16, to the extent the support surface 16 does not include the floor or other surface of the vehicle, is also made from lightweight, durable materials. The frame 14 and the support surface 16 are most often found in a rest position (FIG. 1), wherein the frame 14 is a first distance $D_1$ apart from the support surface 16. The frame 14 and the support surface 16 are movable with respect to each other between the rest position and an attenuated position (FIG. 2), wherein the frame 14 is a second distance $D_2$ apart from the support surface 16. The second distance $D_2$ is less than the first distance $D_1$. Motion between the frame 14 and the support surface 16 is preferably confined to a vertical direction, as will be described below. It is this controlled movement that prevents injury to an occupant of the seat 12 during vertical acceleration forces.

Figure 3:
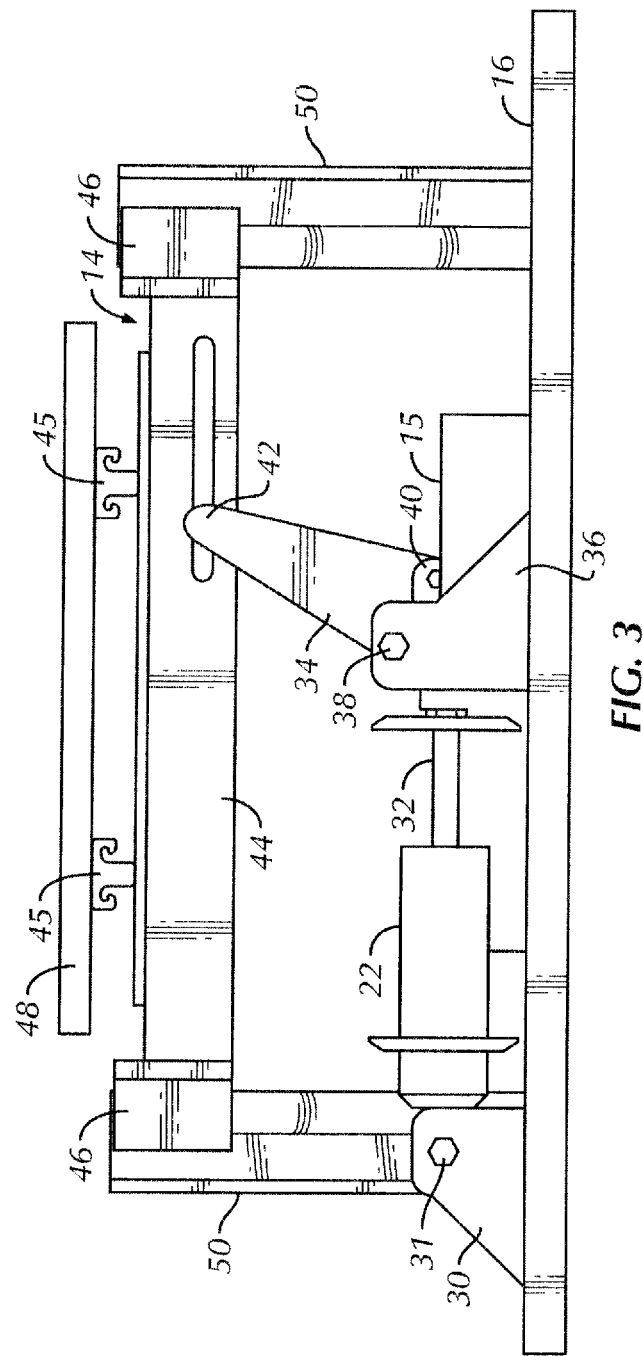
FIG. 3 is an enlarged rear side elevational view of a frame and support surface of the vehicle safety seat system of FIG. 1.
Figure 4:
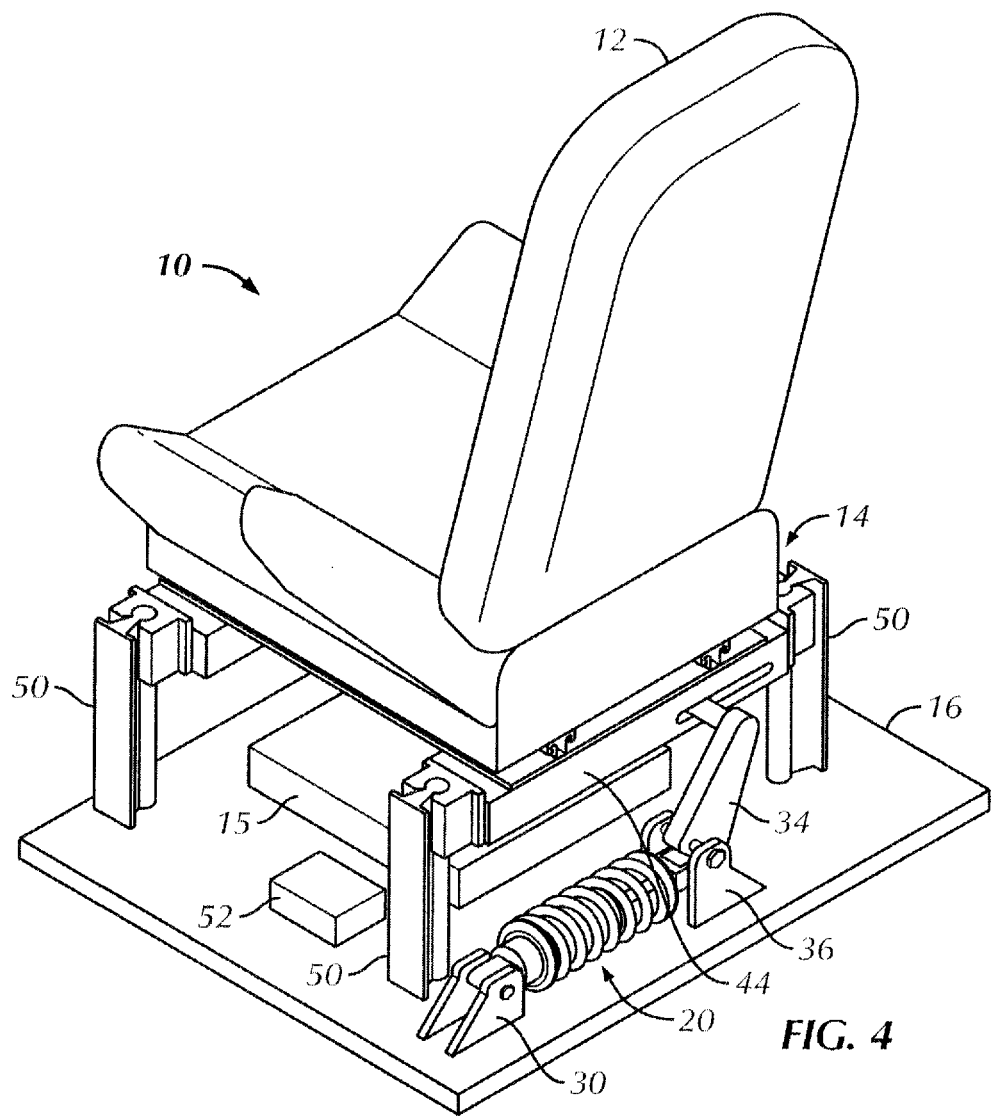
FIG. 4 is a perspective view of the vehicle safety seat system of FIG. 1.

Referring to FIGS. 3 and 4, the support surface 16 may include, positioned beneath the frame 14, a block 15 of energy absorption material having a rate sensitive compression characteristic. The block 15 is preferably secured to the support surface 16 using mechanical fasteners. Alternatively, the block 15 may also be secured to the support surface or the underside of the support surface using an adhesive, hook-and-loop fastener, vacuum, or the like. The material composition of the block 15 is preferably a known energy absorbing crushable material. The block 15 is provided to resist "bottoming out" of the vehicle safety seat system 10 when the frame 14 and the support surface 16 reach the maximum attenuated position (e.g., FIG. 2). The block 15 compresses by a predetermined thickness to absorb the remaining energy not absorbed by the vehicle safety seat system 10, as described in more detail below. The block 15 may alternatively be attached to at least one of an underside of the seat 12 and the frame 14.

Referring to FIGS. 1 and 3, the vehicle safety seat system 10 further includes a dual stage energy absorber 20 operatively coupled between the frame 14 and the support surface 16. The energy absorber 20 preferably includes a damper 22, and more preferably includes a variable resistance damper 22, for example, a variable load shock absorber, such as those manufactured by Penske Racing Shocks of Reading, Pa. The damper 22 is preferably a hydraulic damper, but may also be one of a pneumatic damper, an inversion tube, a wire-bending damper, a rolling torus, rod-pull-through-tube, tension pulley, viscous coupling, or the like. Alternatively, the energy absorber 20 can include any device capable of permitting adjustment of resistance, such as a wire bender, inversion tube, a ball-in-tube, or the like. The energy absorber 20 also preferably includes a biasing mechanism 24, such as a spring or the like, for biasing the frame 14 and the support surface 16 to the rest position, particularly between a blast phase and a slam down phase, as will be described below. The biasing mechanism 24 shown in the drawings is a spring coiled around the damper 22. When the frame 14 and the support surface 16 are in the attenuated position (FIG. 2), the spring 24 is compressed around the damper 22. However, the biasing mechanism 24 need not be part of the energy absorber 20, and may be separately incorporated into the vehicle safety seat system 10 (not shown).

In a preferred embodiment, shown in FIG. 3, the damper 22 (shown in FIG. 3 without the surrounding spring 24) is coupled to the support surface 16 via a first bracket 30 and pin 31. On a side of the damper 22 opposite the first bracket 30, an external piston 32 connects to a bell crank 34. The bell crank 34 is also coupled to the support surface 16 by a second bracket 36 about a pin 38 which forms a pivot point. Pivoting of the bell crank 34 about the pin 38 is controlled by the pivot point and force is carried by an end fitting 40 to the external piston 32 of the energy absorber 20. The bell crank 34 is further coupled to the frame 14 by a frame end fitting 42. While a bell crank 34 is preferred, any mechanical assembly suitable for translating the relative vertical motion of the frame 14 and the support surface 16 into horizontal motion directed to the energy absorber 20 may be utilized, for example, such as a pinion coupling a vertical rack and a horizontal rack. Alternatively, space permitting, the energy absorber 20 may be arranged vertically, such as underneath or behind the seat, to directly resist the relative vertical motion of the frame 14 and the support surface 16, eliminating the need to translate the motion, or may be relocated to the underside or perimeter of the seat frame as defined by vehicle mounting hard points.

Referring now to FIGS. 3 and 4, the frame 14 includes at least one stroking beam 44 having linear bearings 46 at the ends thereof, which surround and slide on support posts 50 for low friction movement in the vertical direction, but prevent horizontal movement in all directions. The linear bearings 46 are preferably rolling-element type bearings made from suitable metals or other materials. The support posts 50 and linear bearings 46 may interact by, for example, wrapping a bearing 46 around a portion of the respective support post 50, providing a track on the support post 50, or the like. The portions of the support posts 50 that interact with the linear bearings 46 are preferably made of hardened or stainless steel, but depending on the type of linear bearing 46, may also be made from tempered aluminum, mild steel, or the like. Any portion of the support posts 50 not interacting with the linear bearings 46 may be made of the same or a different material, preferably a light-weight, durable metal, plastic, or the like. The support posts 50 are fixed to the support surface 16. In a preferred embodiment, two stroking beams 44 are utilized, each being coupled to a pair of support posts 50 (as best seen in FIG. 4). A platform 48 may be provided to mount the seat 12 onto the stroking beams 44. The seat 12 may be fixedly or removably coupled to the platform 48 using brackets 45, or alternatively, the seat 12 may be secured to the platform 48 using bolts or like mechanical fasteners. Other techniques for securing the seat 12 to the platform 48 include adhesives, hook-and-loop fasteners, vacuum, or the like.

FIG. 4 shows a microprocessor 52 mounted on the support surface 16. The microprocessor 52 may be mounted as needed provided it is communicatively coupled with the energy absorber 20 for varying resistance settings of the damper 22. The microprocessor 52 accepts as an input the weight of the occupant in the seat 12. The weight may be input manually, such as through a keypad, automatically measured using a weight sensor operatively coupled to the seat 12 that weighs the occupant, or the like. It is preferred to include at least one weight sensor in the seat 12 such that the weight of the occupant may be periodically updated or continually monitored to compensate for weight changes resulting from adding or removal of equipment by the occupant while seated. Settings of the damper 22 may therefore be updated periodically based on a running average weight. Further, it is preferred that settings of the damper 22 be reset to a neutral value after a zero or negligible weight is sensed for a prolonged duration (e.g., ten seconds). The damper 22 settings will accommodate a $5^{th}$ percentile female up to a $95^{th}$ percentile male soldier equipped with full battle gear.

Figure 5:
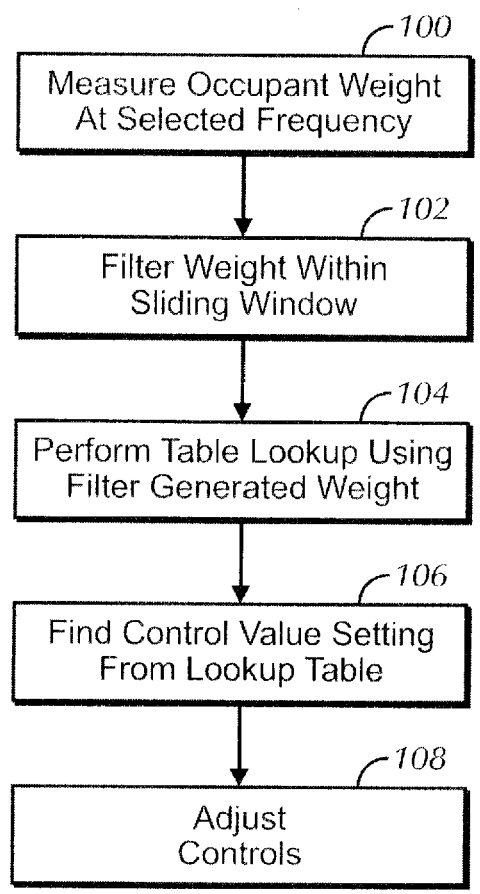
FIG. 5 is a flow diagram illustrating microprocessor logic in accordance with a preferred embodiment of the present invention.

Operation of the vehicle safety seat system 10 will now be described. The damper 22 includes blast and slam down resistance settings, to account for variable loading, and a rebound recovery resistance setting. In certain embodiments, the blast resistance setting is also utilized as the slam down resistance setting. The blast resistance setting is set to a predetermined value by the microcontroller 52 based on the weight of the occupant in the vehicle seat 12 established, preferably immediately after the occupant sits in the seat 12. For example, the microcontroller 52 may follow the logic shown in FIG. 5. Once the weight of the occupant of the seat 12 is determined at step 100, the weight is filtered within a sliding window at step 102 to prevent momentary accelerations due to rough terrain from affecting the capability of the energy absorber 20. For example, the weight range of a $5^{th}$ percentile female to a $95^{th}$ percentile male equipped with full battle gear may be divided into ten pound increments, and the weight of the occupant is placed into one of the ten pound increments. At step 104, the microcontroller 52 initializes a table lookup. At step 106, a blast resistance setting value is found. At step 108, the microcontroller 52 adjusts the resistance of the damper 22 to the blast resistance setting value.

For embodiments where a slam down resistance setting is also adjusted, the procedure is preferably identical. In certain embodiments, the rebound recovery resistance setting is fixed for all occupants because, as will be described below, during recovery of the vehicle safety seat system 10, the occupant is experiencing a force of 1 g and is not firmly coupled to the seat 12. However, it is within the scope of embodiments of the present invention to adjust the rebound recovery resistance setting as described above with other settings. The vehicle safety seat system 10 also preferably is redundant to allow the energy absorber 20 to function despite battle damage. For example, in the event of a systemic or local power failure, the damper 22 will function at resistance settings based on the last measured weight of the occupant. As described above, the weight of the occupant will be measured by a weight sensing system when the occupant sits in the seat 12 and stored by the microprocessor 52. The occupant's weight will be monitored throughout the mission to determine if the occupant's weight has changed due to the addition or deletion of equipment. The microprocessor 52 preferably only utilizes weight data gathered while the vehicle is not experiencing significant vertical acceleration.

Once a vehicle encounters a mine, explosive, or other trauma resulting in a sudden vertical acceleration, the "blast phase" is entered. During the blast phase, the frame 14 strokes downward a defined distance through rotation of frame end fitting 42. Blast forces are transmitted by the bell crank 34 to the energy absorber 20. The damper 22 resists respective motion of the frame 14 toward the support surface 16 based upon the blast resistance setting. The damper 22 resists the motion until the frame 14 and the support surface 16 reach the attenuated position.

After completion of the blast phase, when the forces from the blast are no longer impacting the vehicle, the biasing mechanism 24 returns the frame 14 and support surface 16 to the rest position through the bell crank 34. In one embodiment, the damper 22 does not resist the return motion of the frame 14 and the support surface 16. Alternatively, the damper 22 resists respective motion of the frame 14 and the support surface 16 based upon the rebound recovery resistance setting. Recovery takes place as the vehicle is returning to the ground. The damper 22 resists the motion until the frame 14 and the support surface 16 reach the rest position prior to the "slam down phase." The recovery period is on the order of approximately 100 milliseconds. Once the vehicle impacts the ground following a blast, further sudden vertical accelerations are experienced by the occupant. Thus, the slam down phase is entered. Once again, the frame 14 strokes downward and the damper 22 resists respective motion of the frame 14 and the support surface 16 based upon either the previous blast resistance setting or a separate slam down resistance setting, as described above. Motion is resisted until the frame 14 and the support surface 16 again reach the maximum attenuated position or the event is over. The biasing mechanism 24 preferably returns the frame 14 and the support surface 16 to the rest position once again following completion of the slam down phase. The sequence may be repeated as necessary to prevent occupant injury.

Although several preferred embodiments of the vehicle safety seat system 10 have been described herein, other embodiments may be employed without departing from the scope of the invention. It is contemplated that the vehicle safety seat system 10 is capable of accommodating occupants from a 5$^{th}$ percentile female in civilian clothing to a 95$^{th}$ percentile male with full combat gear and equipment. Further, the resistance settings are preferably established in accordance with accepted vertical acceleration forces for human tolerance as expressed by, for example, well-known Eiband tolerance curves or other Injury Assessment Reference Values (IARVs), as found commonly in the literature. Changing threats and revisions to human tolerance threshold values may also result in changes to the resistance settings.

Figure 6:
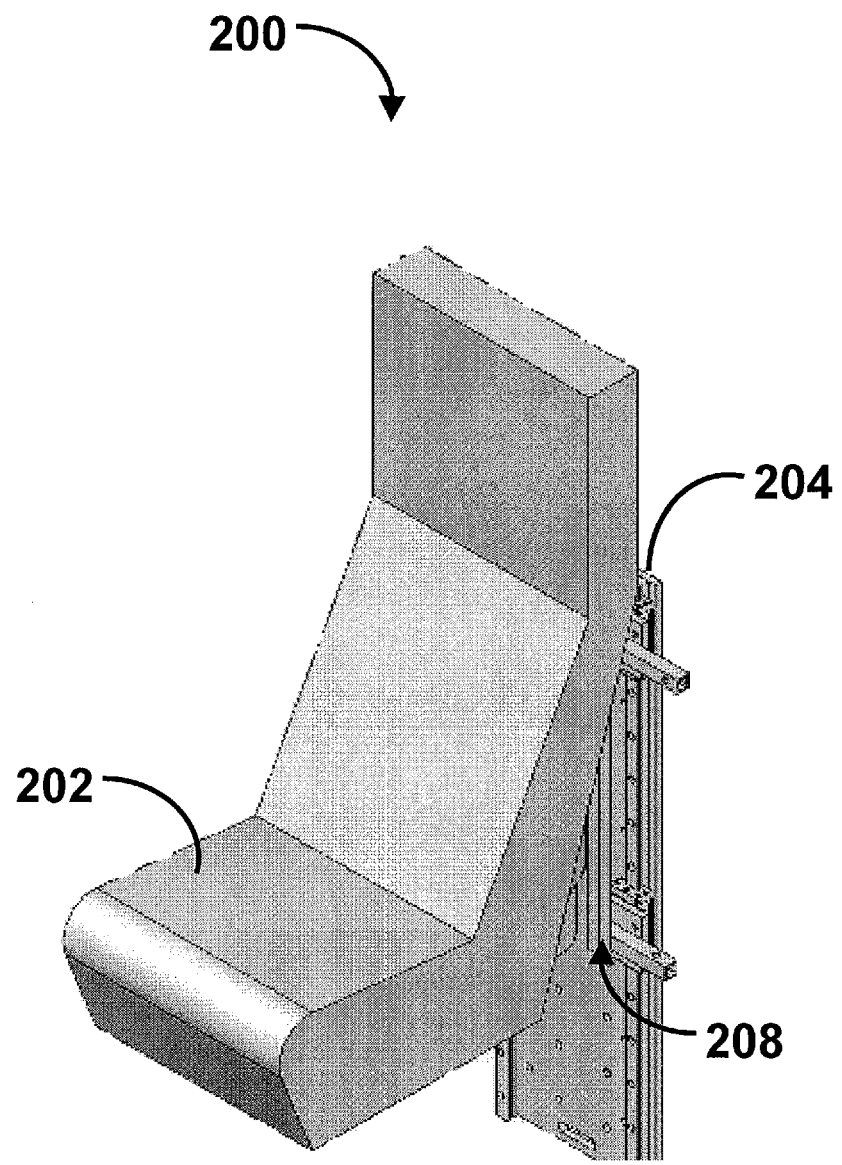
FIG. 6 is a perspective view of a vehicle safety seat system in a rest position in accordance with a second preferred embodiment of the present invention.
Figure 7:
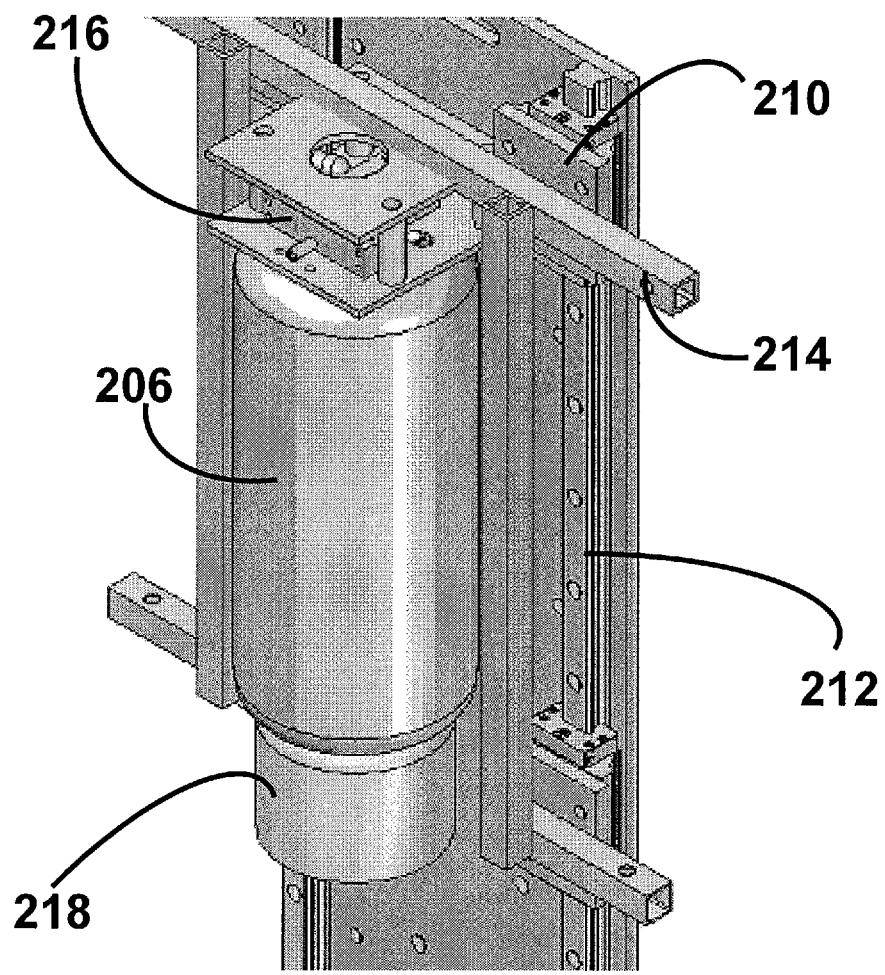
FIG. 7 is an enlarged perspective view of a pneumatic bladder of the vehicle safety seat system of FIG. 6.
Figure 8:
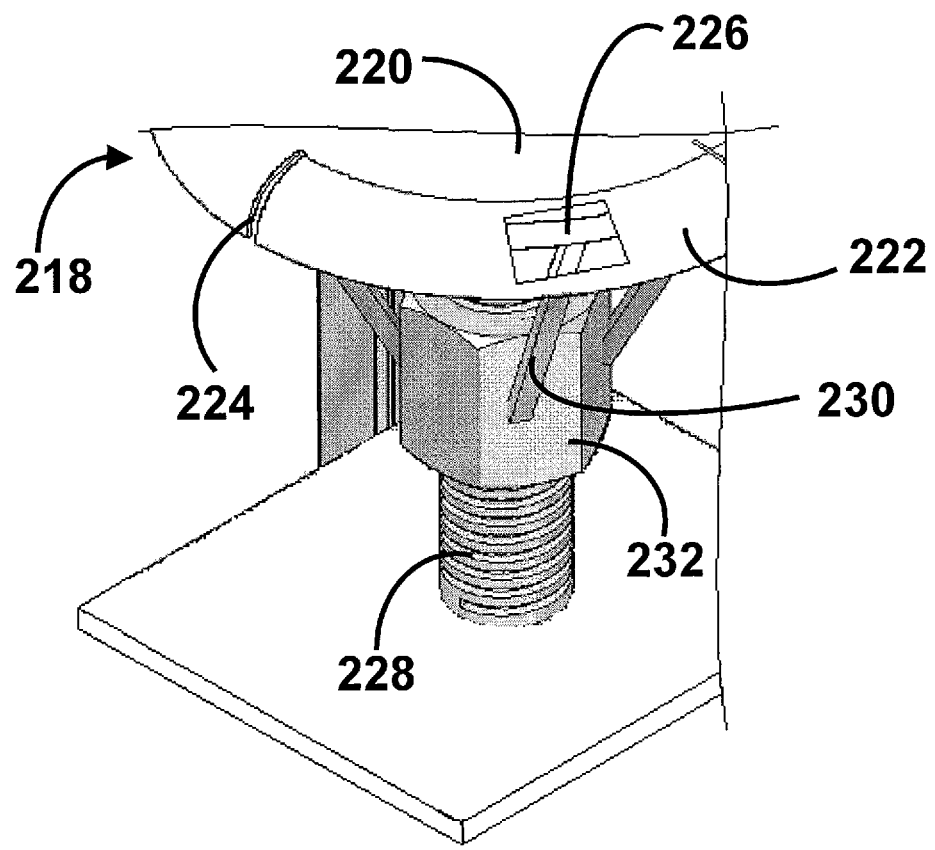
FIG. 8 is an enlarged partial perspective view of a platform for the bladder of FIG. 7.

Referring to FIGS. 6-8, a second preferred embodiment of a vehicle safety seat system will now be described. The vehicle safety seat system 200 includes a vehicle seat 202 and a support surface 204 supporting the vehicle seat 202. The support surface 204 is preferably a wall of the vehicle, but may be any other surface capable of supporting the seat 202. The vehicle seat 202 is preferably similar to vehicle seat 12 in the first embodiment, and therefore a complete description of the seat has been omitted. The vehicle seat 202 and support surface 204 are movable with respect to each other between a rest position, wherein the vehicle seat 202 is located a first distance from a bottom surface of the vehicle (see e.g., D1 in FIG. 1), and an attenuated position, wherein the vehicle seat 202 is located a second distance from the bottom surface of the vehicle (see e.g., D2 in FIG. 2). The first distance is greater than the second distance. A frame 208 is preferably used to movably couple the vehicle seat 202 to the support surface 204. The frame 208 preferably includes a plurality of linear bearings 210 on posts 212 located on both lateral sides of the frame 208 to provide relative linear motion of the vehicle seat 202 and support surface 204. The vehicle seat 202 is preferably mounted on at least one crossbar 214 coupled to a respective pair of linear bearings 210.

A deformable bladder 206 is operatively coupled between the vehicle seat 202 and the support surface 204. The bladder 206 is preferably made from an elastomeric material, such as natural rubber, but may also be formed from other unsaturated or saturated rubbers, or the like. The bladder 206 is shown in FIG. 7 as having a cylindrical shape, but is not so limited, and may take other shapes and forms, particularly in order to compensate for maximizing vehicle space. The bladder 206 contains a fluid such as a gas therein. The gas is preferably nitrogen, but may also be argon, air with a low moisture content, or the like. A valve 216 with a gas release setting is in fluid communication with the gas in the bladder 206. The valve 216 is preferably a relief valve. The gas release setting is preferably set to a predetermined value based on a weight of the occupant of the seat 202.

The vehicle seat 202 is configured to, during a blast phase where the vehicle seat 202 and the support surface 204 move with respect to each other toward the attenuated position, deform the bladder 206 against the support surface 204 such that a predetermined volume of gas is released through the valve 216 according to the gas release setting to resist the respective motion of the vehicle seat 202 and the support surface 204 until the vehicle seat 202 and support surface 204 reach the attenuated position.

The support surface 204 preferably includes a platform 218 in contact with the bladder 206, and against which the bladder 206 is deformed during the blast phase. The platform 218 preferably has an adjustable contour, which can affect the reactive force transmitted by the deformable bladder 206. For example, in one embodiment, shown in FIG. 8, the platform 218 is mounted on a threaded post 228 and includes an upper portion 220 having a fixed diameter and a flexible skirt 222 extending downwardly from the upper portion 220. The skirt 222 is preferably made of steel. The skirt 222 may include a plurality of slots 224 therein to allow more flexibility in the skirt 222. The skirt 222 is preferably disposed on a flexible ring 226 (shown in the cut-away portion of FIG. 8). The ring 226 may be coupled to at least one, and preferably multiple arms 230 that are rotatably mounted to a nut 232 engaged to the threaded post 228. The nut 232 is movable along the threaded post 228 to angle the arms 230, thus changing the diameter of the ring 226. The contour of the platform 218 is thereby altered. Movement of the nut 232 may be performed by rotation of the threaded post 228.

Following the blast phase, pressure of the gas remaining in the bladder 206 forces the vehicle seat 202 and the support surface 204 toward the rest position. In order to prevent further injury during this transition, the valve 216 is preferably further configured to release a portion of the remaining gas, thus slowing the relative motion of the vehicle seat 202 and the support surface 204. As a result, the vehicle seat 202 and the support surface 204 will generally come to rest at a third position intermediate the rest position and the attenuated position. The safety seat system 200 is thus prepared for a slam down phase or subsequent blasts. Damping of the return of the vehicle seat 202 and the support surface 204 may also be accomplished by other methods, such as an external damper or the like. Similarly, return of the vehicle seat 202 and the support surface 204 toward the rest position can also be accomplished by re-inflating the bladder 206 with gas. The gas may be stored within a reservoir (not shown) that receives and holds the predetermined volume of gas that was released during the blast phase.

Figure 9:
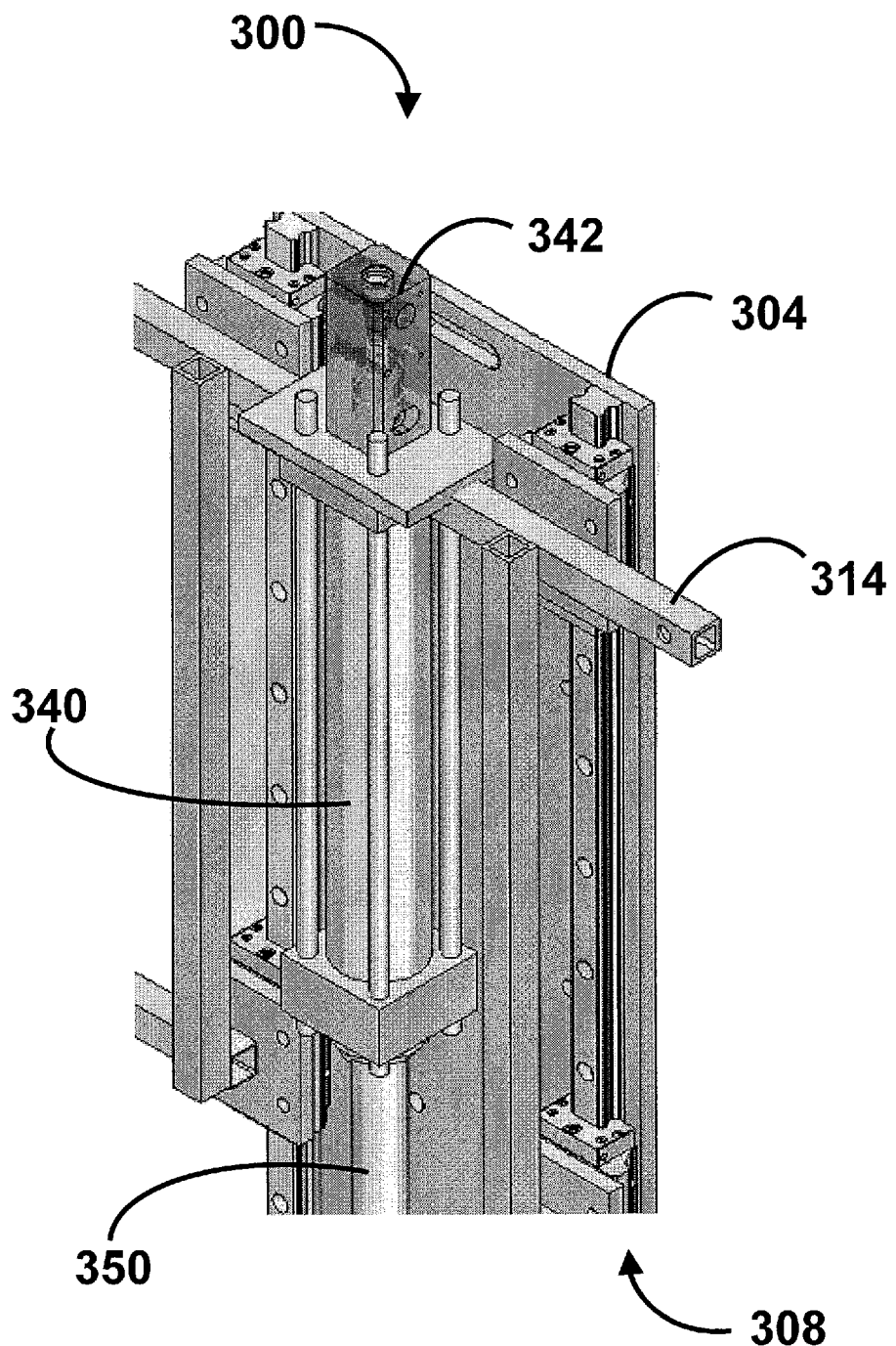
FIG. 9 is a perspective view of a hydraulic cylinder for a vehicle safety seat system in accordance with a third preferred embodiment of the present invention.
Figure 10:
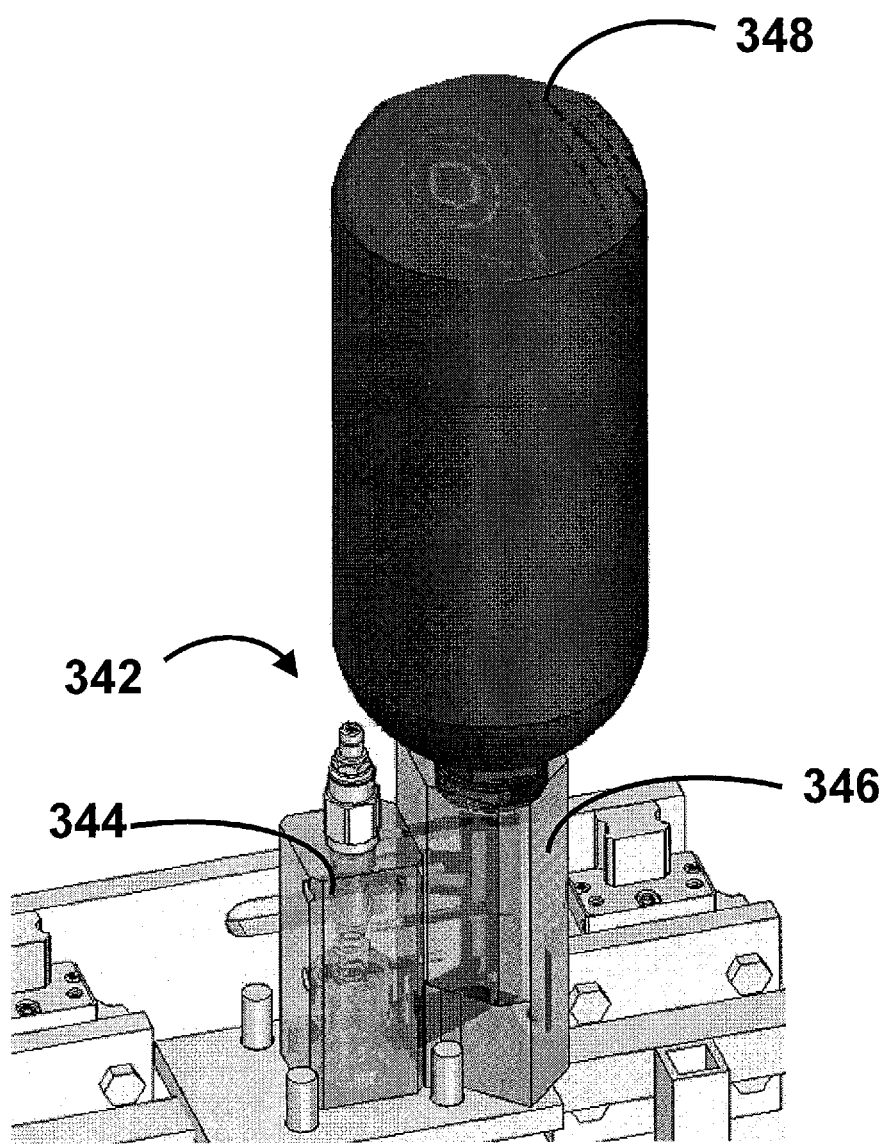
FIG. 10 is a valve and reservoir system for use with the hydraulic cylinder of FIG. 9.

Referring to FIGS. 9-10, a third preferred embodiment of a vehicle safety seat system 300 will now be described. The third embodiment is similar to the second embodiment described above. Like numerals have been used for like elements, except the 300 series numerals have been used for the third embodiment. Accordingly, a complete description of the third embodiment has been omitted, with only the differences being described.

A hydraulic cylinder 340 is operatively coupled to the vehicle seat (not shown in FIG. 9 but mounted similarly to vehicle seat 202 in FIG. 6) and is configured for movement therewith. For example, the cylinder 340 may be coupled to a crossbar 314 of the frame 308. The cylinder 340 preferably has a hydraulic or other fluid therein. A valve 342 is in communication with the hydraulic fluid in the cylinder 340 to release the hydraulic fluid from the cylinder 340 when a fluid pressure in the cylinder 340 exceeds a predetermined value. The predetermined pressure value is preferably automatically set at least partially based on a weight of the occupant of the vehicle seat. The valve 342 preferably includes a spool valve 344 and a relief valve 346. The released hydraulic fluid is preferably received in a reservoir 348 coupled to the valve 342.

A piston 350 is coupled to the support surface 304 and is configured to, during a blast phase where the vehicle seat and the support surface 304 move with respect to each other toward the attenuated position, displace the hydraulic fluid in the cylinder 340 according to the predetermined fluid pressure value to resist the respective motion of the vehicle seat and the support surface 304 until the vehicle seat and support surface 304 reach the attenuated position. An auxiliary spring, such as that shown in FIG. 1 may surround the piston 350 and bias the vehicle seat and the support surface 304 to the rest position following completion of the blast phase.

Figure 11:
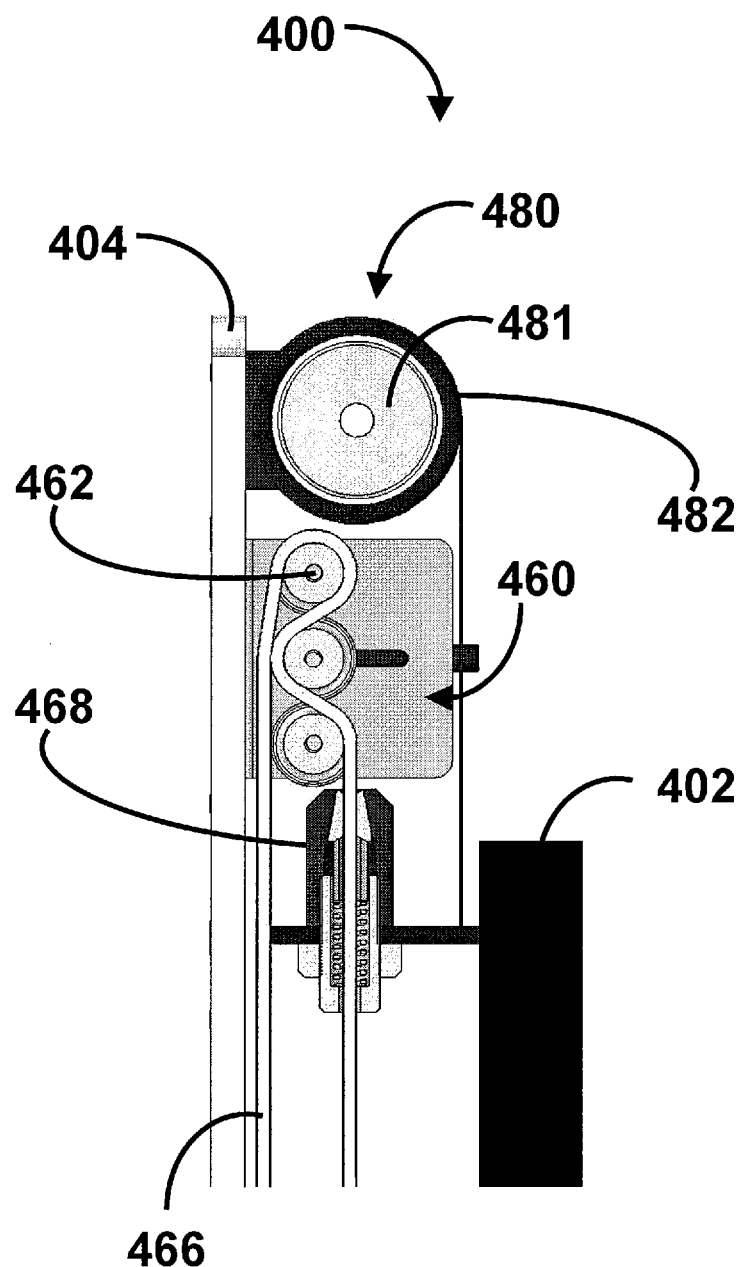
FIG. 11 is a side elevational view of a vehicle seat safety system in accordance with a fourth preferred embodiment of the present invention.
Figure 12:
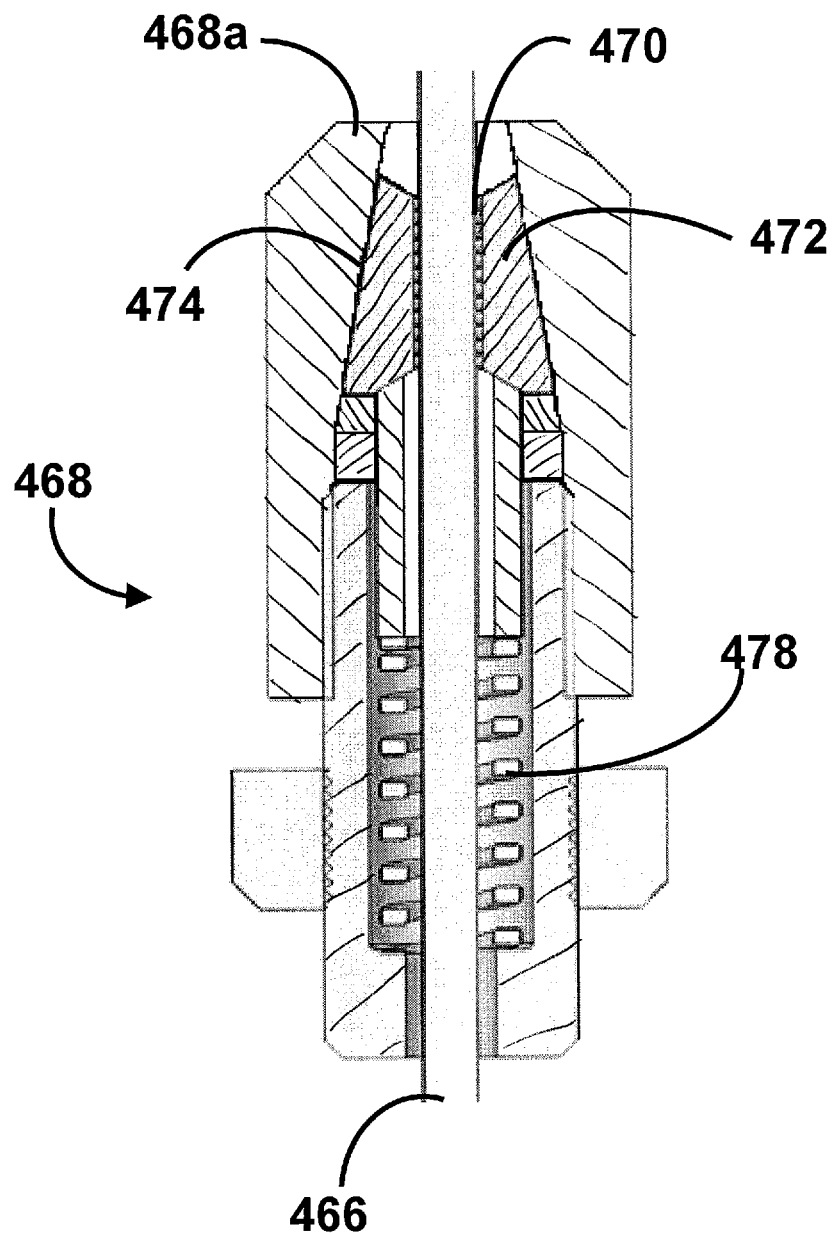
FIG. 12 is an enlarged partial elevational cross-sectional view of a sliding collet for use in the vehicle seat safety system of FIG. 11.
Figure 13:
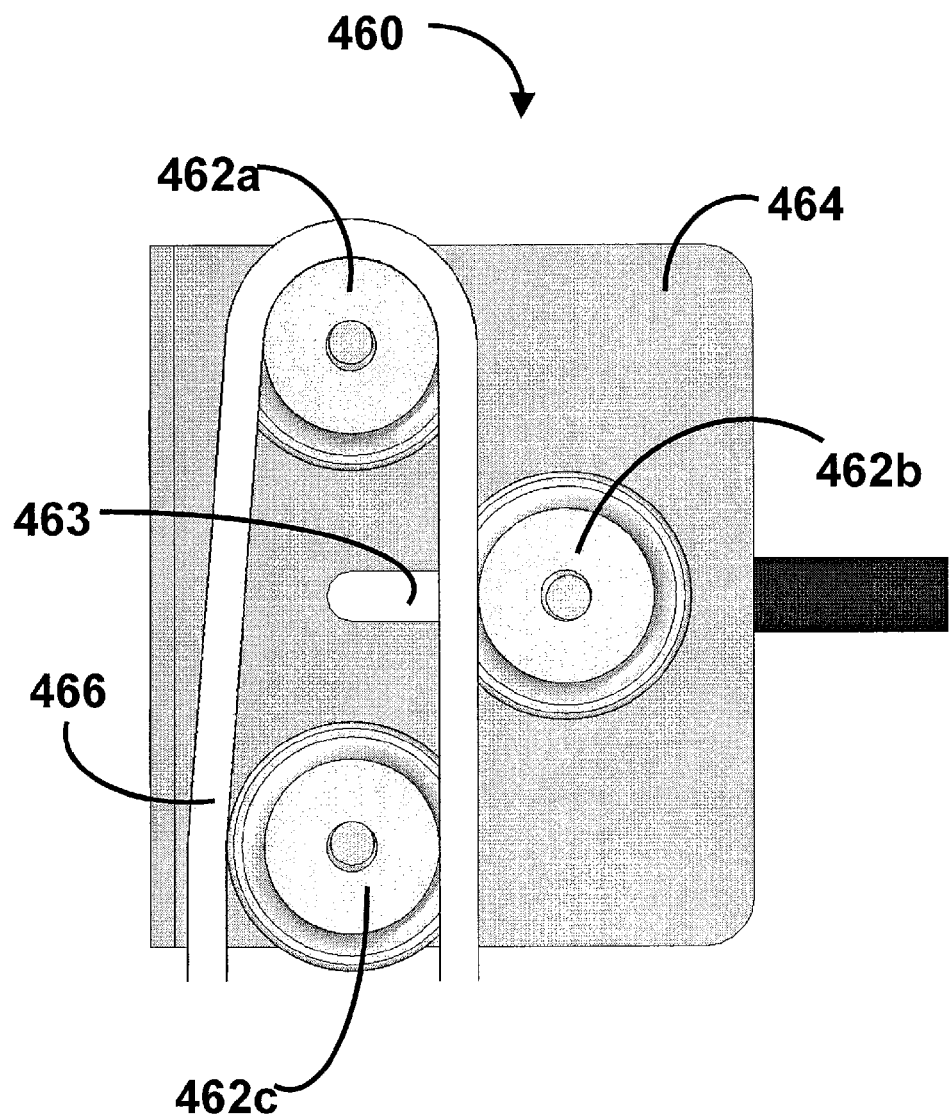
FIG. 13 is an enlarged side elevational view of a roller assembly for use with the vehicle seat safety system of FIG. 12.

Referring to FIGS. 11-13, a fourth preferred embodiment of a vehicle safety seat system 400 will be described. The fourth embodiment is similar in some respects to the second and third embodiments described above. Like numerals have been used for like elements, except the 400 series numerals have been used for the fourth embodiment. Accordingly, a complete description of the fourth embodiment has been omitted, with only the differences being described.

A roller assembly 460 is coupled to the support surface 404 and includes a plurality of rollers 462. The rollers 462 are preferably rotatably coupled to a roller support 464. At least one of the plurality of rollers 462 has an adjustable position on the roller assembly 460 with respect to the other ones of the plurality of rollers 462. For example, as shown in FIG. 13, middle roller 462b is movable with respect to the top and bottom rollers 462a, 462c via slot 463 on the roller support 464. A flexible rod 466 is received by the roller assembly 460 and is routed through the plurality of rollers 462. The rod is preferably made of tempered spring steel, but may also be made from stainless steel, mild steel, aluminum, or other deformable material. The vehicle seat 402 is connected to the rod 466 and configured to, during a blast phase where the vehicle seat 402 and the support surface 404 move with respect to each other toward the attenuated position, pull the rod 466 in a direction of motion of the vehicle seat 402. The roller assembly 460 resists respective motion of the vehicle seat 402 and the support surface 404 until the vehicle seat 402 and the support surface 404 reach the attenuated position by applying a tension to the rod 466 as the rod 466 is deformed over the plurality of rollers 462.

The tension is set to a predetermined value. Preferably, the predetermined value of the tension is automatically set based at least in part on a weight of an occupant of the vehicle seat 402. The tension is set to the predetermined value by adjusting the position of the at least one adjustable roller (e.g., 462b). The more that the rod 466 is deformed among the rollers 462, the greater is the tension during motion of the rod 466 through the roller assembly 460.

The vehicle seat 402 is preferably connected to the rod 466 by a sliding collet 468, or similar structure. The sliding collet 468 is coupled to the vehicle seat 402 and surroundingly engages the rod 466, as is shown in FIGS. 11 and 12. A clamping surface 470 within the collet 468 is configured to engage with the rod 466 during the blast phase. The clamping surface 470 is preferably part of a clamping member 472 disposed within the collet 468 and is movable along the rod 466 with respect to the collet 468. The collet 468 includes an interior surface 474 that contacts an exterior surface 476 of the clamping member 472. The interior surface 474 of the collet 468 is preferably contoured to form a taper or curve toward an end 468a of the collet 468 proximate the roller assembly 460, such that radial pressure is applied to the exterior surface 476 of the clamping member 472 as the clamping member 472 is moved toward the end 468a of the collet 468. The radial pressure causes the clamping surface 470 to tightly engage the rod 466 so that the rod 466 may be pulled by the vehicle seat 402 through the rollers 462.

Following the blast phase, the sliding collet 468 is preferably configured to release the clamping surface 470 from the rod 466 and slide along the rod 466 until the vehicle seat 402 and the support surface 404 return to the rest position or some intermediate position. Preferably, the collet 468 includes a spring 478 that causes the clamping member 472 to engage the rod 466 so that during the blast phase the clamping member 472 is in position to clamp the rod 466. Following the blast phase, a return spring 480 may bias the vehicle seat 402 and the support surface 404 to the rest position. After the blast phase, the return spring 480 forces the sliding collet 468 to move relative to the rod 466, which causes the clamping member 472 to move downward relative to the internal surface 474 against the spring 478 to disengage the rod 466.

The spring 480 may include a spool 481 and cable 482. The spool is preferably rotatably mounted to the support surface 404 and an end of the cable 482 is coupled to the vehicle seat 402. The wire is preferably of high strength, such as braided steel. Alternatively, the spring 480 may consist of one or more gas-charged springs, steel coil springs, or the like to bias the vehicle seat 402 and the support surface 404 to the rest position.

From the foregoing, it can be seen that embodiments of the present invention comprise a vehicle safety seat system, and particularly a dual stage variable load energy absorber for preventing injuries to occupants in vehicles during mine blasts or the like for both blast and slam down crash phases. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A mine blast and slam down protective vehicle safety seat system comprising:
    (a) a vehicle seat;
    (b) a support surface supporting the vehicle seat, the vehicle seat and support surface being movable with respect to each other between a rest position, wherein the vehicle seat is located a first distance from a bottom surface of the vehicle, and an attenuated position, wherein the vehicle seat is located a second distance from the bottom surface of the vehicle, the first distance being greater than the second distance;
    (c) a deformable bladder operatively coupled between the vehicle seat and the support surface, the deformable bladder containing a gas therein; and
    (d) a valve with a gas release setting in fluid communication with the gas in the bladder, the vehicle seat being configured to, during a blast phase where the vehicle seat and the support surface move with respect to each other toward the attenuated position, deform the bladder against the support surface such that a predetermined volume of gas is released through the valve according to the gas release setting to resist the respective motion of the vehicle seat and the support surface until the vehicle seat and support surface reach the attenuated position.

2. The system of claim 1, wherein the support surface includes a platform in contact with the bladder.

3. The system of claim 2, wherein the platform has an adjustable contour.

4. The system of claim 3, wherein the platform comprises an upper portion having a fixed diameter and a flexible skirt extending downwardly from the upper portion.

5. The system of claim 4, wherein the flexible skirt is disposed on a flexible ring.

6. The system of claim 5, wherein the platform is mounted to a threaded post.

7. The system of claim 6, wherein the flexible ring is coupled to the threaded post by at least one arm rotatably mounted to a nut engaged to the threads of the post, the nut being movable along the threaded post.

8. The system of claim 1, wherein the gas release setting is set to a predetermined value at least partially based on a weight of an occupant of the vehicle seat.

9. The system of claim 1, wherein after the blast phase where pressure in the bladder forces the vehicle seat and the support surface toward the rest position, the valve is configured to release a portion of gas remaining in the bladder.

* * * * *